May 13, 1930. E. ZAHRADNIK 1,758,874
DIRIGIBLE HEADLIGHT
Filed Jan. 31, 1929 2 Sheets-Sheet 1
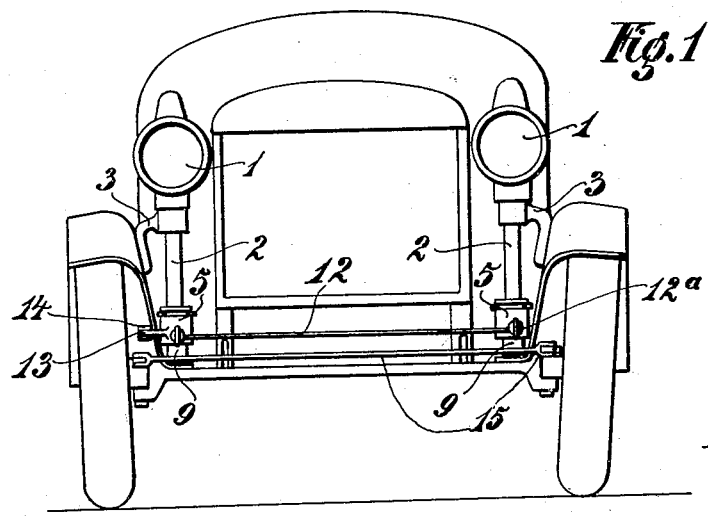
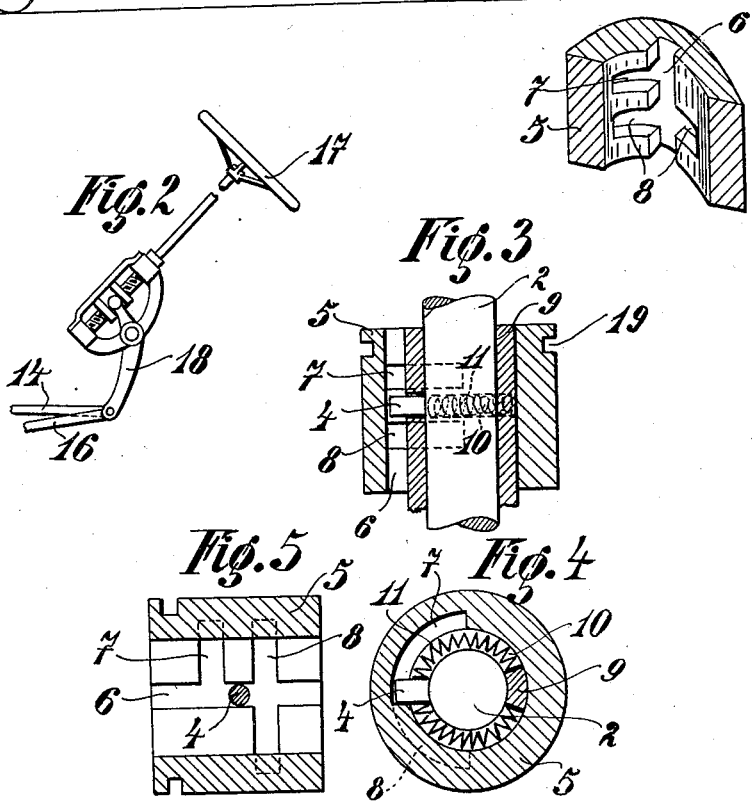
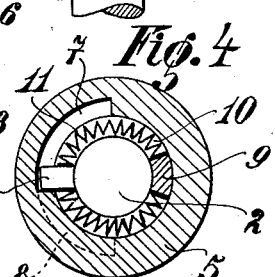

May 13, 1930.  E. ZAHRADNIK  1,758,874
DIRIGIBLE HEADLIGHT
Filed Jan. 31, 1929    2 Sheets-Sheet 2
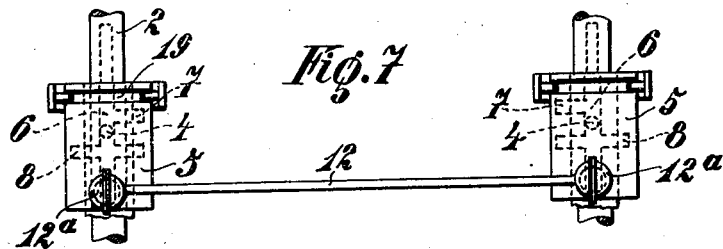
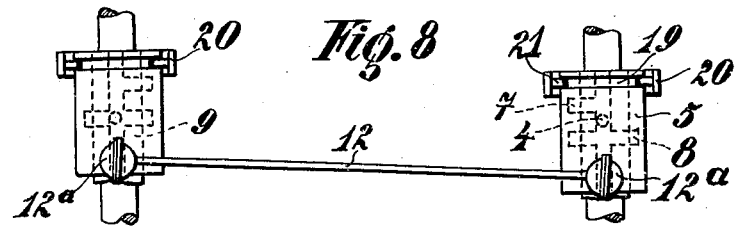
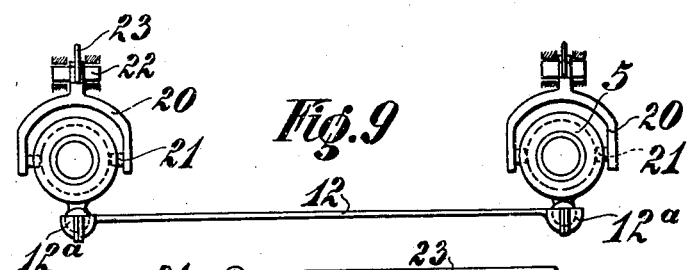
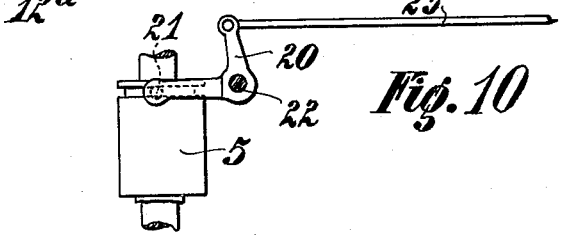

Patented May 13, 1930

1,758,874

UNITED STATES PATENT OFFICE

EUSTACH ZAHRADNIK, OF VIENNA, AUSTRIA

DIRIGIBLE HEADLIGHT

Application filed January 31, 1929, Serial No. 336,462, and in Austria May 3, 1928.

Automatically adjustable headlights for power driven vehicles are already known with an arrangement by means of which the lamps are individually or jointly engaged with or disconnected from the steering wheel.

The invention relates to a special construction of such an arrangement.

An embodiment of the invention is illustrated by way of example in the accompanying drawing in which:

Fig. 1 shows in front elevation the headlights with steering mechanism fitted to an automobile.

Fig. 2 shows a side elevation of the steering wheel with a portion of the steering mechanism.

Figs. 3 to 6 show various cross-sections of the coupling means between the lamp and steering mechanism.

Figs. 7 to 10 show in various positions the whole arrangement of this coupling means.

The lamps 1 arranged at the sides of the radiator are swivally mounted with their shank 2 in the bearing arms 3. On each shank 2 a radially projecting pin 4 is provided (Figs. 3-5) which forms a member of a clutch. The other clutch member consists of a sleeve 5, which possesses a longitudinal groove 6 and two cross grooves 7, 8 at a distance from one another. The cross groove 7 extends from the longitudinal groove 6 over a quarter of the circumference of the sleeve bore. The other cross groove 8 extends not only over this quarter of the circumference but also over the opposite quarter i. e. over half the circumference of the sleeve bore. Between the shank 2 and the sleeve 5 a sleeve 9 is provided which is rigidly secured to the vehicle, e. g. to the mudguard (Fig. 1) and has a cross slot 10 which serves for accommodating one or two compression springs. These springs bear at the one end against the solid portion of the wall of the sleeve 9 and at the other end against the clutch pin 4. The two clutch sleeves 5 are mutually positively connected together by means of a connecting rod 12 (Fig. 1). The clutch sleeve 9 situated on the steering wheel side is connected by means of a radial arm 13 with a connecting rod 14. This rod is hinged with a connecting rod 16, acting on a steering swivel rod 15, said connecting rod 16 being hinged on a steering lever 18 actuated in the known manner from the steering wheel 17. When the steering wheel is being operated, the front wheels and simultaneously the lamps will be accordingly turned.

Owing to the clutch arrangement it is possible to engage either only one or both lamps with the steering wheel, or also to disengage both lamps from the latter. When negotiating curves only the outside lamp is engaged so that it turns on its axle, in accordance with the curve described by the vehicle, whereas the inside lamp does not participate in the turning movement. The inside lamp, at the turning into a cross road, will therefore still illuminate the main road thus increasing the safety of the traffic. With this object in view the following arrangement has been provided:

Two fork levers 20 engage each with one pin 21 in a ring groove 19 of the two sleeves 5. The fork levers 20 are swivally mounted by means of bolts 22 on the chassis of the vehicle and actuated from the driver's seat by means of a hand lever, crank or the like (not shown), which is connected with the fork lever 20 by means of draw bars 23. Moreover the grooves 7 of the two sleeves 5 are arranged in opposite directions.

If the two sleeves 5 are so displaced that the clutch pins 4 of both lamps are within the range of the grooves 7 extending over a quarter circle only the clutch pin 4 of the lamp actually on the outside will be carried along and therefore only this lamp will be turned. If the sleeves 5 are so displaced that the pin 4 engage with the semi-circular grooves 8, the lamps remain unaffected by the movement of the steering wheel as in the case of driving during the day time. In order to displace both lamps when operating the steering wheel, the clutch sleeves 5 have to be displaced so that the pins 4, as shown in Figs. 5 and 7 engage between the walls of the longitudinal groove 6. When the clutch sleeves 5 are in the initial position the lamps return to their normal position through the action of the springs 11, so that the pins 4 once more engage in the longitudinal grooves 6.

For engaging the lamps both sleeves 5 need not be raised together when the sleeves are normally in the disengaging position as in this case it is sufficient, the grooves 7, 8 being suitably arranged, only to raise that sleeve which has to be coupled with the lamp. In order to enable this to be attained whilst retaining the connecting rod 12, the points of connection of the rod 12 consists of ball joints $12^a$. In Fig. 8 the pin 4 shown on the right of the drawing is connected with the sleeve 5, whereas the groove 8 is opposite the left hand pin 4 and consequently this lamp is disengaged.

I claim:

1. Automatically adjustable headlamps for power driven vehicles, comprising in combination with the steering wheel, the lamps having each a shank, rods connecting said steering wheel with said two lamps, radial pin on each lamp shank, and sleeves one for each lamp having a longitudinal groove and two circumferential grooves of different lengths adapted to be adjusted so that said pins come into the range of one of said circumferential grooves or remain in said longitudinal groove the lamps being not influenced from the steering wheel in the first case or turned one of them or both according to whether the pin of one or both shanks is in engagement with the corresponding circumferential groove.

2. Automatically adjustable headlamps as specified in claim 1 in which the radial pins are spring-controlled so that the lamps are automatically returned into the initial position when the coupling is disengaged.

In testimony whereof I affix my signature.

EUSTACH ZAHRADNIK.